(12) United States Patent
Blanks

(10) Patent No.: US 10,353,194 B2
(45) Date of Patent: *Jul. 16, 2019

(54) M-ARY FREQUENCY PRESENCE MODULATION COMMUNICATION SYSTEM AND METHOD

(71) Applicant: BOOZ ALLEN HAMILTON INC., McLean, VA (US)

(72) Inventor: Keith A. Blanks, Colorado Springs, CO (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/394,033

(22) Filed: Dec. 29, 2016

(65) Prior Publication Data

US 2018/0191445 A1 Jul. 5, 2018

(51) Int. Cl.
*H04B 10/00* (2013.01)
*G02B 26/08* (2006.01)
(Continued)

(52) U.S. Cl.
CPC ....... *G02B 26/0816* (2013.01); *G02B 27/286* (2013.01); *G02B 27/30* (2013.01); *G02B 27/4244* (2013.01); *H04B 10/118* (2013.01)

(58) Field of Classification Search
CPC .............. H04B 10/112; H04B 10/1121; H04B 10/1123; H04B 10/1125; H04B 10/1129;
(Continued)

(56) References Cited

U.S. PATENT DOCUMENTS 6,920,290 B2 *  7/2005  Mitra ................. H01S 3/2383
                                                         398/202
7,127,168 B2 * 10/2006  Kani ................... H04B 10/506
                                                         398/79
(Continued)

FOREIGN PATENT DOCUMENTS

EP      2670103 A1    12/2013
WO  2009-085254 A1     7/2009

OTHER PUBLICATIONS

Gennady P. Berman et al., "Suppression of intensity fluctuations in free space high-speed optical communication based on spectral encoding of a partially coherent beam;" Science Direct, Optics Communications 280, Aug. 2007, pp. 264-270.

(Continued)

*Primary Examiner* — Hanh Phan
(74) *Attorney, Agent, or Firm* — Buchanan Ingersoll & Rooney PC

(57) ABSTRACT

An optical communication system having a data transmitter which includes: at least one optical emission device to output light energy as an optical beam having an operating bandwidth; a beam dividing device to receive and divide the operating bandwidth into plural communication bands; a frequency presence modulation unit to: spectrally segregate the bandwidth of at least one communication band into plural channels, and modulate the bandwidth to selectively produce an optical output signal with wavelengths that correspond to one or more of the channels, wherein presence and absence of energy within channels constitute an information packet for data communication; a controller for providing a control signal to the frequency presence modulation unit to spectrally segregate the bandwidth of the at least one communication band into the plural channels; and a telescope to transmit the optical output signal.

26 Claims, 13 Drawing Sheets

(51) Int. Cl.
*G02B 27/42* (2006.01)
*G02B 27/30* (2006.01)
*G02B 27/28* (2006.01)
*H04B 10/118* (2013.01)

(58) Field of Classification Search
CPC ............. H04B 10/114; H04B 10/1141; H04B 10/1143; H04B 10/1149; H04B 10/548; H04B 10/516; H04B 10/506; H04B 10/118; H04B 10/541; H04J 14/02
USPC ......... 398/79, 183, 188, 192, 193, 194, 195, 398/196, 201, 118, 119, 129, 130, 131, 398/127, 128, 45, 48, 49, 121, 122, 186, 398/187, 135, 136; 359/237, 291, 292, 359/245, 248, 238, 247
See application file for complete search history.

(56) References Cited

U.S. PATENT DOCUMENTS

| | | | | |
|---|---|---|---|---|
| 8,031,391 | B2* | 10/2011 | Bartlett | G02B 6/2931 359/223.1 |
| 8,144,321 | B2* | 3/2012 | Duncan | G01J 3/02 356/310 |
| 10,050,715 | B1* | 8/2018 | Blanks | H04B 10/5563 |
| 2002/0075539 | A1 | 6/2002 | Iida et al. | |
| 2003/0134607 | A1 | 7/2003 | Raghavan et al. | |
| 2004/0042798 | A1* | 3/2004 | Kehr | H04B 10/1123 398/135 |
| 2010/0310256 | A1 | 12/2010 | Shpantzer et al. | |
| 2012/0044565 | A1 | 2/2012 | Wang et al. | |
| 2013/0182620 | A1 | 7/2013 | Chaffee et al. | |
| 2015/0171957 | A1 | 6/2015 | Featherston et al. | |
| 2015/0358087 | A1 | 12/2015 | Pavlas et al. | |
| 2018/0191446 | A1* | 7/2018 | Blanks | G02B 27/283 |

OTHER PUBLICATIONS

Gennady P. Berman et al., "High Data-rate, Free-space Laser Communication Based on Frequency Encoding of a Partially Coherent Beam;" Los Alamos National Laboratory, pp. 98-99, 2009.

Chihiro Yamanka et al., "Development of a terawatt coherent white light lidar system and applications to environmental studies;" Multispectral, Hyperspectral, and Ultraspectral Remote Sensing Technology, Techniques, and Applications II, Proc. of SPIE vol. 7149, 71490Z, 2008, pp. 1-8.

International Search Report (ISR) and Written Opinion dated Nov. 8, 2017, for PCT/US2017/043937.

* cited by examiner

M-ARY FREQUENCY PRESENCE MODULATION COMMUNICATION SYSTEM AND METHOD

FIELD

The present disclosure relates to a communication system and method that uses M-ARY frequency presence modulation.

BACKGROUND

Existing satellite laser communications systems utilize narrow bandwidth (<2 nanometer) sources and modulation techniques, such as Binary Phase Shift Keying (BPSK) for the extant European Data Relay System (EDRS), and Differential Phase Shift Keying (DPSK) for NASA's Laser Communication Relay Demonstration (LCRD). These systems rely on the speed of phase shifting near infrared telecommunications electronics for data encoding, not the available bandwidth of the source.

A paper entitled "Suppression of intensity fluctuations in free space high-speed optical communication based on spectral encoding of a partially coherent beam" in Science Direct, Optics Communications 280, August 2007, pages 264-270, by Gennady P. Berman et al. describes a free space, high-speed (Gbps) optical communication system based on spectral encoding of radiation from a broadband pulsed laser. This paper describes that scintillations can be suppressed by orders of magnitude for distances of more than 10 km with the use of partially coherent laser beams and a relatively slow photosensor.

A paper entitled "High Data-rate, Free-space Laser Communication Based on Frequency Encoding of a Partially Coherent Beam" by Gennady P. Berman et al., Los Alamos National Laboratory, describes a free-space, high-speed optical communication (FSOC) system based on spectral encoding of radiation from a broadband, pulsed laser. This paper proposes to extend a technique of scintillation suppression, based on time averaging of a partially coherent beam, to a gigabit data rate FSOC.

A paper entitled "Development of a terawatt coherent white light lidar system and applications to environmental studies" by Chihiro Yamanka et al., Multispectral, Hyperspectral, and Ultraspectral Remote Sensing Technology, Techniques, and Applications II, Proc. Of SPIE Vol. 7149, 71490Z, 2008, describes a white light lidar system which uses an intense femtosecond laser pulse and self-trapping in atmospheric-pressure of Kr gas to obtain multi-wavelength backscattering and depolarization profiles from aerosols and clouds.

SUMMARY

An exemplary embodiment of the present disclosure provides an optical communication system, having a data transmitter which includes: at least one optical emission device configured to output light energy as an optical beam having an operating bandwidth; a beam dividing device arranged to receive and divide the operating bandwidth of the optical beam into bandwidth portions of plural communication bands; a frequency presence modulation unit configured to: spectrally segregate a bandwidth portion of at least one communication band into plural channels, and modulate the bandwidth portion to selectively produce an optical output signal with wavelengths that correspond to one or more of the channels, wherein a presence and absence of energy within channels of the communication band will constitute an information packet for data communication; a controller for providing a control signal to the frequency presence modulation unit to spectrally segregate the bandwidth portion of the at least one communication band into the plural channels; and a telescope configured to transmit the optical output signal.

An exemplary embodiment of the present disclosure provides a method for optical communication, the method including: outputting, by at least one optical emission device, light energy as an optical beam having an operating bandwidth on to a beam dividing device; dividing, by the beam dividing device, the operating wavelength of the optical beam into bandwidth portions of plural communication bands; spectrally segregating, by a frequency presence modulation unit, a bandwidth portion of at least one communication band into plural channels; modulating, by the frequency presence modulation unit, the bandwidth portion to selectively produce an optical output signal with wavelengths that correspond to one or more of the channels, wherein a presence and absence of energy within channels of the communication band will constitute an information packet for data communication; and transmitting, by a telescope, the optical output signal.

An exemplary embodiment of the present disclosure provides an optical communication system having a data transmitter that includes: at least one optical emission device configured to output light energy as an optical beam having an operating bandwidth with at least one communication band; a frequency presence modulation unit configured to: spectrally segregate a bandwidth of the at least one communication band into plural channels, and modulate the bandwidth to selectively produce an optical output signal with wavelengths that correspond to one or more of the channels, wherein a presence and absence of energy within channels of the communication band will constitute an information packet for data communication; a controller for providing a control signal to the frequency presence modulation unit to spectrally segregate the bandwidth of the at least one communication band into the plural channels; and a telescope configured to transmit the optical output signal.

A method for optical communication, the method including: outputting, by at least one optical emission device, light energy as an optical beam having an operating bandwidth with at least one communication band; spectrally segregating, by a frequency presence modulation unit, a bandwidth of at least one communication band into plural channels; modulating, by the frequency presence modulation unit, the bandwidth to selectively produce an optical output signal with wavelengths that correspond to one or more of the channels, wherein a presence and absence of energy within channels of the communication band will constitute an information packet for data communication; and transmitting, by a telescope, the optical output signal.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

Figure 1:
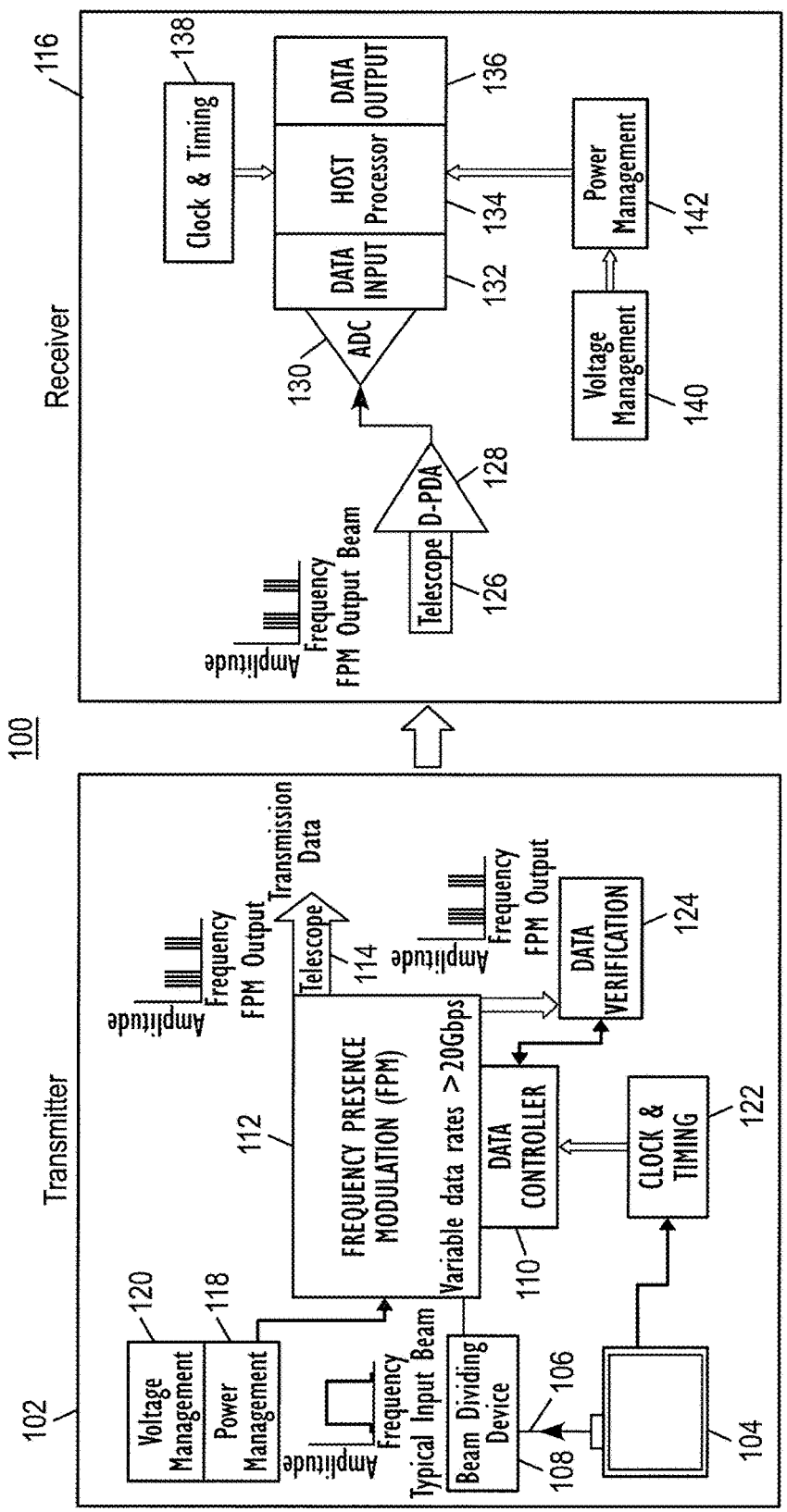
FIG. 1 is a block diagram illustrating a system hardware architecture in accordance with an exemplary embodiment.

The present disclosure is directed to an optical communication system that performs M-ary frequency presence modulation to capitalize on the available bandwidth of an optical emission device (i.e., laser, LED, etc.) to encode data for data transmission. M-ary transmission is a type of digital modulation where instead of transmitting one bit at a time, two or more bits are transmitted simultaneously. M-ary is multilevel signaling communication where M=number of discrete signal or voltage levels, N=number of bits, and $M=2^N$. M-ary can be used to design a communication system that is bandwidth efficient. The transmitter considers 'N' bits at a time, and it produces one of M signals where $M=2^N$. This type of transmission results in reduced channel bandwidth. The optical communication system can achieve data transmission rates that are for example equal to or greater than 20 Gigabits per second (Gbps), and can transmit data over distances greater than 30 km (plus or minus ten percent) under nominal field conditions. Data can be transmitted over distances less than 30 km. Data rates can be validated using the 100 Gigabit Ethernet (100 GbE) standard.

The optical communication system can be used for terrestrial, airborne, and space optical communications, for example. System and methods of the present disclosure use frequency presence modulation of the operating bandwidth of the optical emission device for very high data rate, variable data rate, or moderate date rate optical communications. M-ary frequency presence modulation enables very high throughput, and a single optical emission device results in more than a 50% reduction in size, weight, and power envelope compared to approaches using multiple optical emission devices. The M-ary frequency presence modulation schema uses a presence and absence of spectral content within the operating bandwidth of the optical emission device (i.e., the transmission source). For ultra-wide bandwidth emission sources (e.g., lasers, light emitting diodes, etc.), the spectral content of the optical emission device is first spectrally segregated into individual communication bands, followed by channelization of the spectral content within the band. Channel content is electronically and optically directed to, or removed from the transmission path. For narrow bandwidth optical emission devices, the functionality of the M-ary frequency presence modulation schema is unchanged from when an ultra-wide bandwidth optical emission device is used, although the electronic and optical components may differ from those used for ultra-wide bandwidth transmission.

The optical communication system of the present disclosure can be used as a free space optical (FSO) communications network. The benefits of a FSO communications network span every telecommunications mission that intends to leave Earth's atmosphere. The use of free space optical networks has been envisioned as a desirable alternative to radio based communications technology for a variety of reasons. Presently, free space optical networks do not compete for frequency space allocation. Optical communications are inherently more secure than radio based communications, have the side benefit of ranging an order of magnitude better than presently employed radio frequency tracking techniques, and offer reduced size, weight, and power burden.

FIG. 1 shows an optical communication system 100 in accordance with an exemplary embodiment. The optical communication system 100 includes a data transmitter 102 and a data receiver 116. The data transmitter 102 includes at least one optical emission device 104 configured to output light energy as an optical beam 106 having an operating bandwidth. For example, the operating bandwidth could be 1600 nanometers. However, the bandwidth could be any nanometer range. In an exemplary embodiment, the at least one optical emission device 104 can be, for example, an ultra-wide bandwidth (for example, greater than 1,000 nm) laser or an ultra-wide bandwidth (for example, greater than 300 nm) light emitting diode (LED). The at least one optical emission device 104 can also be, for example, a narrow band laser (for example, less than 5 nm) or a narrow band (for example, less than 5 nm) light emitting diode. For example, the optical emission device 104 can be a commercially available deep red LED based transmitter with the appropriate H-alpha filters in order to only transmit within the H-alpha band. In an exemplary embodiment, the at least one optical emission device 104 is a single optical emission device. In an exemplary embodiment, the optical emission device 104 is a laser with approximately 1600 nm of bandwidth (e.g., anywhere between 1500 to 1800 nm) per pulse and is un-polarized (i.e., contains both vertical and horizontal polarized light). The laser pulse repetition rate can be, for example, 60 Mhz. However, any repetition rate can be used.

The data transmitter 102 also includes a beam dividing device 108 arranged to receive and divide the operating bandwidth of the optical beam 106 into plural communication bands. In an exemplary embodiment, the beam dividing device 108 is, for example, at least one spectral bandpass filter, at least one fiber optic grating (e.g., a Fiber Bragg Grating), etc. The ultra-wide bandwidth of the optical emission device 104 is spectrally separated into bands of a user defined bandwidth via the beam dividing device 108. In an exemplary embodiment, each of the plural communication bands has the same bandwidth. For example, if the optical emission device 104 is a laser with approximately 1600 nm of bandwidth, a 100 nm spectral bandpass filter yields 16 independent bands each having 100 nm bandwidth, a 50 nm spectral bandpass filter yields 32 independent bands each having 50 nm bandwidth, etc.

Figure 7:
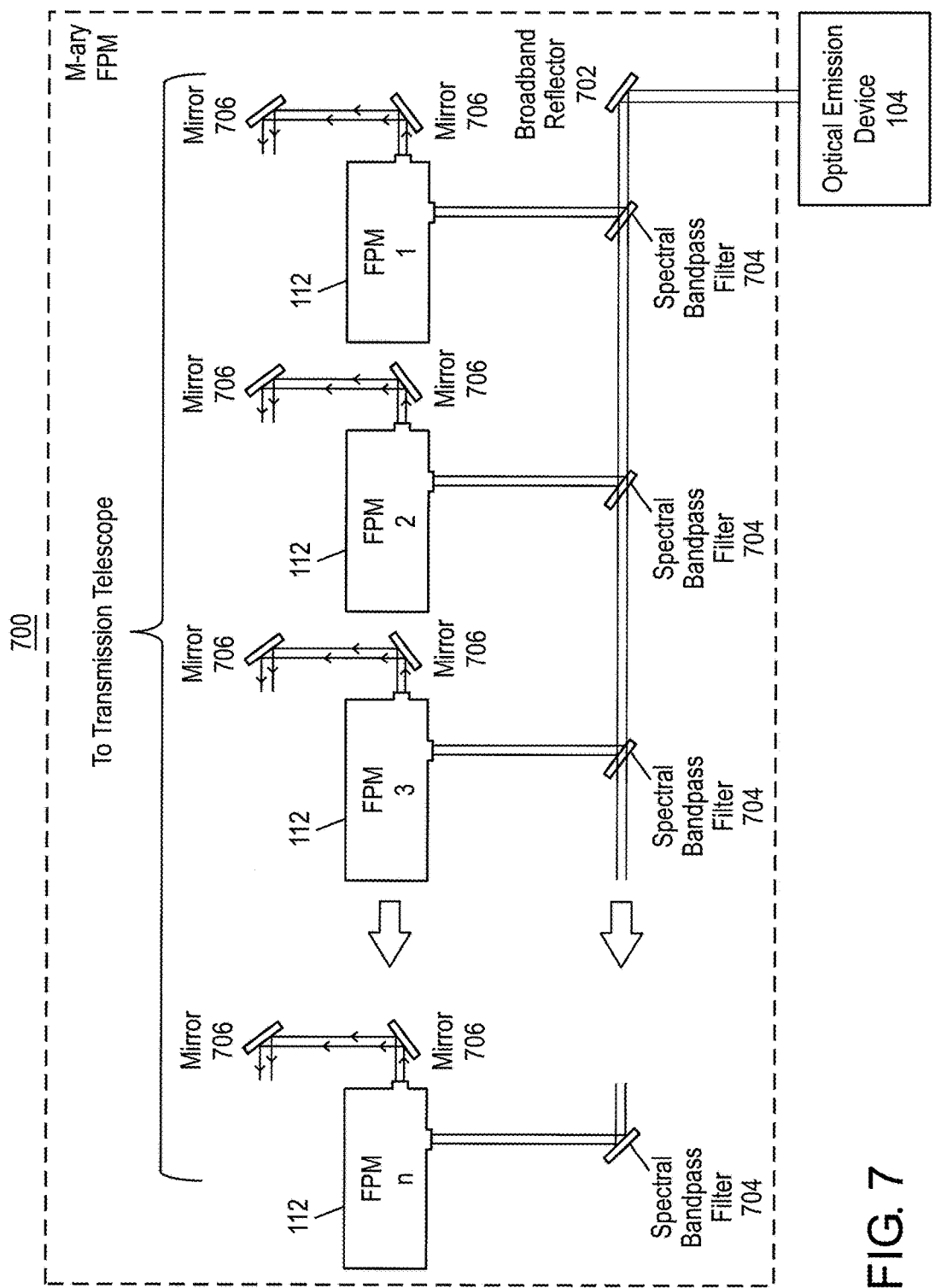
FIG. 7 is a block diagram illustrating a system hardware architecture in accordance with an exemplary embodiment.

The data transmitter 102 also includes a frequency presence modulation unit 112 configured to spectrally segregate the bandwidth of at least one communication band into plural channels. That is, the frequency presence modulation unit 112 is used to encode (channelize) data within the pulse emitted by the optical emission device 104. In an exemplary embodiment, a frequency presence modulation unit 112 is used for each band that has been spectrally separated within the bandwidth of the optical emission device 104. For example, if the optical emission device 104 is divided into sixteen 100 nm bands, sixteen frequency presence modulation units 112 can be used to channelize each individual band separately. Each of the sixteen frequency presence modulation units 112 would channelize bands having different frequencies. This is illustrated in FIG. 7, where there are n frequency presence modulation units 112. FIG. 7 shows how the n frequency presence modulation units 112 are connected to the telescope 114 and the optical emission device 104, and will be discussed in further detail later.

Figure 6:
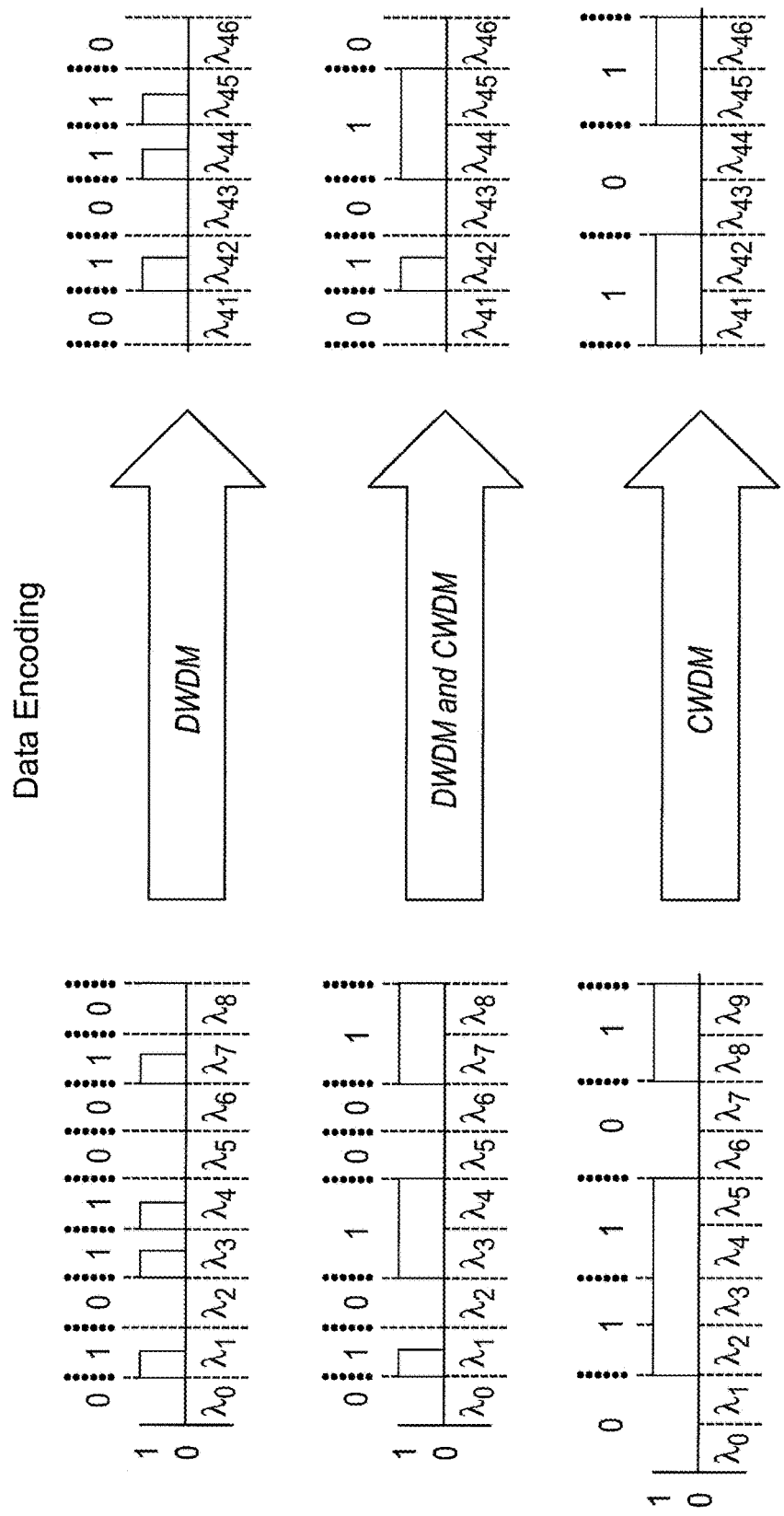
FIG. 6 illustrates data encoding performed in accordance with an exemplary embodiment.

The number of channels per band is adjustable depending on the data rates the optical communication system 102 is built/designed to achieve. For very high data rates (>1 Gbps) per band dense wavelength (bandwidth <2 nm) channelization could be used. For example, the channel bandwidth could be between 1-2 nm, such as 1.8 nm. Coarse wavelength (bandwidth >2 nm) channelization can be used for data rates of 100's of Mbps. For example, the channel bandwidth could be 5 nm. The channels in a band can have the same bandwidth or different bandwidths as shown in FIG. 6. For example, the upper illustration in FIG. 6 is an example of Dense Wave Division Multiplexing (DWDM), and shows all of the channels within one band having the same bandwidth. The lower illustration in FIG. 6 is an example of Coarse Wave Division Multiplexing (CWDM), and shows all of the channels within one band having the same bandwidth. The bandwidth of one channel in the lower illustration of FIG. 6 is approximately twice the bandwidth of one channel in the upper illustration of FIG. 6. The middle illustration in FIG. 6 is an example of both DWDM and CWDM, and at least one channel in the band has a different bandwidth than another channel in the same band. Simultaneous dense and course wavelength channelization enables variable data rates.

The frequency presence modulation unit 112 is also configured to modulate the bandwidth to selectively produce an optical output signal (i.e., the frequency presence modulation output beam) with wavelengths that correspond to one or more of the channels, wherein the presence and absence of energy within channels of the communication band will constitute an information packet for data communication. This is illustrated in FIG. 6, in which the presence of energy within a channel represents a logic 1 value, and the absence of energy in a channel represents a logic 0 value.

Figure 2:
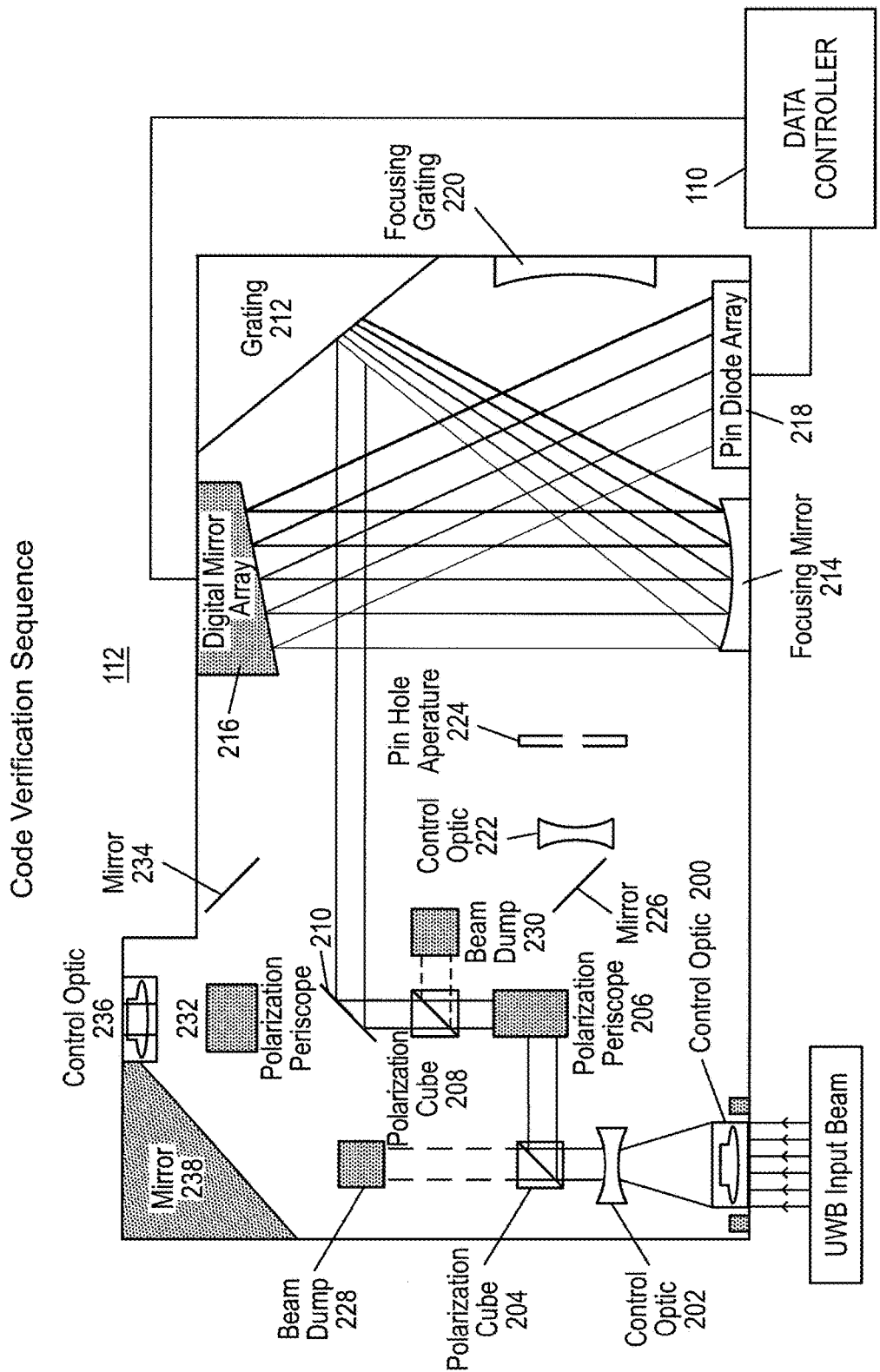
FIG. 2 illustrates a hardware architecture of a frequency presence modulation unit in accordance with an exemplary embodiment.

FIG. 2 is an exemplary embodiment showing the hardware architecture of the frequency presence modulation unit 112 during a code verification sequence, which is a mode in which a beam is not outputted from the frequency presence modulation unit 112 (i.e., a non-transmit mode). In FIG. 2, the frequency presence modulation unit 112 includes plural beam adjustment components that adjust the orientation of an input beam from the beam dividing device 108, and output an adjusted beam. For example, the plural beam adjustment components include a control optic 200, a control optic 202, a polarization cube 204, a polarization periscope 206, a polarization cube 208, and a mirror 210. The control optic 200 receives as input the optical beam 106 outputted from the optical emission device 104. The control optic 200 is an input optic for the spectral bandwidth of interest having very high transmission with the spectral bandpass, and very high attenuation of spectral content outside of the spectral bandpass. For example, if the optical emission device 104 is a vertical beam source with a bandwidth from 400 nm to 2100 nm, if the frequency presence modulation unit 112 is designed to channelize the band from 500 nm to 600 nm, the control optic 200 would allow light to pass through it in the 500 nm to 600 nm range, and not allow light outside of the 500 nm to 600 nm range into the frequency presence modulation unit 112. The control optic 202 can be used to collimate the beam outputted from the control optic 200. The polarization cube 204 can be a high extinction coefficient (for example, >$10^5$) polarization cube oriented to reflect vertically polarized light. This removes residual horizontal polarized light by transmitting the residual horizontal polarized light to the beam dump 228 (i.e., a photon graveyard) located in line with the polarization cube 204. The polarization periscope 206 is a sequence of mirrors (e.g., two mirrors) which changes the vertical height of the laser beam and also rotates the polarization from vertical to horizontal. The polarization cube 208 can be a high extinction coefficient (for example, >$10^5$) polarization cube oriented to reflect any residual vertically polarized light into the beam dump 230 and transmit the horizontal polarized light onto the mirror 210 which reflects the light onto the grating 212.

In FIG. 2, the frequency presence modulation unit 112 also includes a grating 212 that receives the adjusted beam from the plural beam adjustment components (e.g., 200, 202, 204, 206, 208, and 210), disperses the spectral content of the adjusted beam, and redirects the dispersed spectral content. The frequency presence modulation unit 112 also includes a focusing mirror 214 that receives the dispersed spectral content from the grating 212 and focuses the dispersed spectral content. The focusing mirror 214 is a reflective mirror that properly disperses (separates) the wavelengths (frequencies) of the spectral band across the digital mirror array 216. The focusing mirror 214 can be, for example, a metallic coated mirror, a dielectric coated mirror, etc. Metallic coated mirrors are generally polarization insensitive (i.e., reflectivity does not change) and dielectric coated mirrors are polarization sensitive (reflectivity does change). The type of mirror can be selected based on whether it will be used for vertical polarized light or horizontal polarized light.

The frequency presence modulation unit 112 also includes a digital mirror array 216 that receives the focused and dispersed spectral content from the focusing mirror 214 and performs the spectral segregation of the bandwidth of the at least one communication band into the plural channels by adjusting at least one digital mirror in the digital mirror array 216. The mirrors in the digital mirror array 216 can be controlled electronically so that their angle relative to the incident beam can be changed, which changes the propagation direction of the reflected beam. In an exemplary embodiment, the digital mirror array 216 can be a 1,024× 1,024 array of mirrors. However, it is possible that only a section of the array is controlled by the controller 110. For example, a 3×1,024 section can be controlled so that the refresh rate is optimized.

The frequency presence modulation unit 112 also includes a pin diode array 218 that is used to convert light received onto the array into electrical current that is sent to the controller 110 for verification of the data encoding. In the code verification sequence of FIG. 2, the digital mirrors in the digital mirror array 216 are in the "off" state (i.e., position/angle), and all of the light that is input into the frequency presence modulation unit 112 ends up on the pin diode array 218. That is, light incident on the grating 212 is spectrally dispersed onto the digital mirror array 216, which reflects the light onto the pin diode array 218. The code verification sequence shown in FIG. 2 can detect abnormalities in the components of the frequency presence modulation unit 112, because you expect to receive the same frequencies on the pin diode array 218 as those inputted into the frequency presence modulation unit 112. If this is not the case, the controller 110 can make this determination by comparing the frequencies detected by the pin diode array 218 to the frequencies inputted into the frequency presence modulation unit 112. The non-transmit mode is equivalent to a sequence of zeroes (off states) being transmitted and sequence of ones (on states) being verified.

The frequency presence modulation unit 112 also includes several components that are not used in the code verification sequence of FIG. 2, i.e., a focusing grating 220, a control optic 222, a pin hole aperture 224, a mirror 226, a polarization periscope 232, a mirror 234, a control optic 236, and a mirror 238. These components will be explained with reference to FIG. 3.

Figure 3:
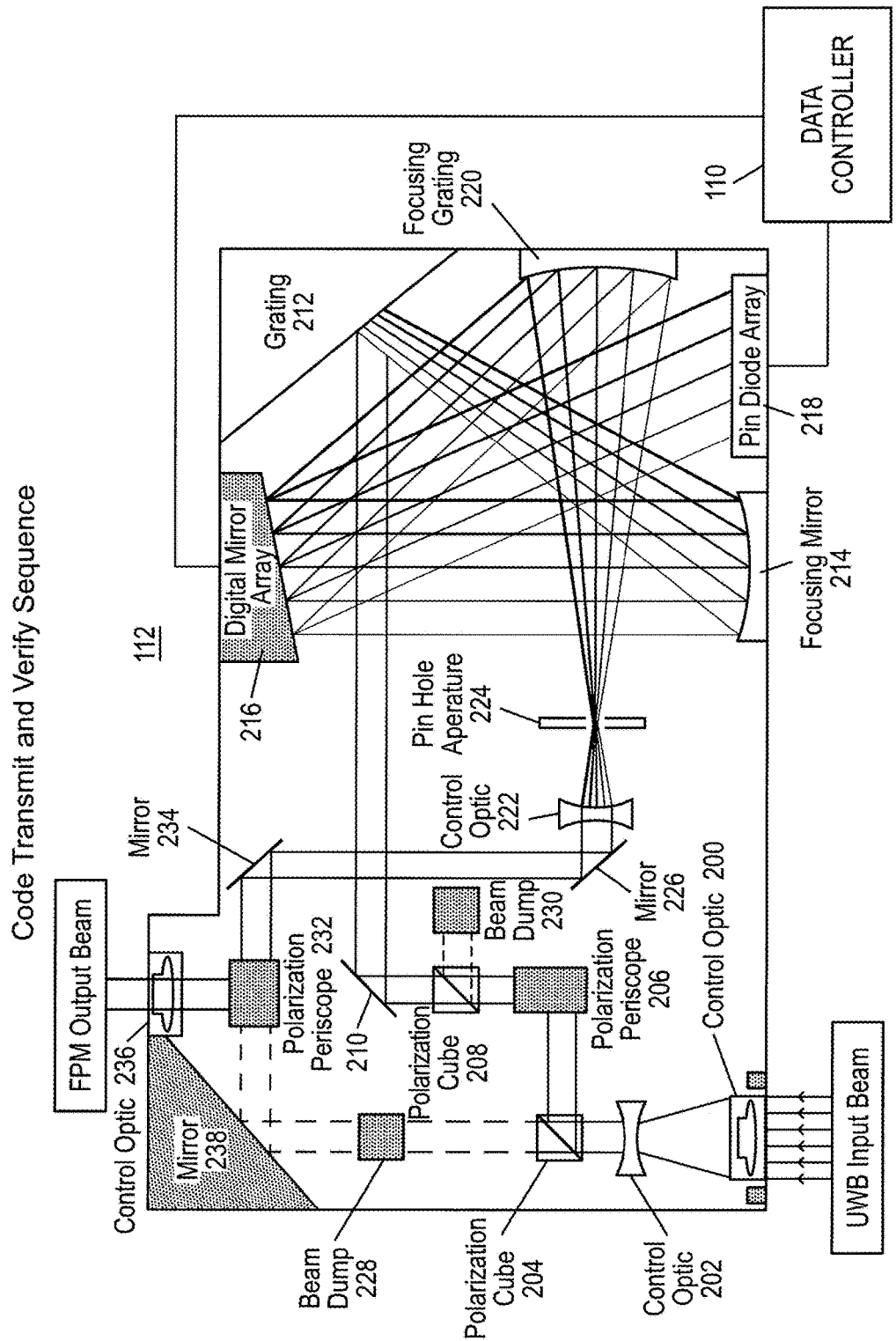
FIG. 3 illustrates a hardware architecture of the frequency presence modulation unit in accordance with an exemplary embodiment.

FIG. 3 shows is an exemplary embodiment showing the hardware architecture of the frequency presence modulation unit 112 during a code transmit and verify sequence in which channelizing of the pulse occurs. During code transmission and verification, digital mirrors in the digital mirror array 216 are in an active state, and the angle relative to the incident beam is being electronically changed, which changes the propagation direction of the incident beam. In FIG. 3, the components upstream of the focusing mirror 214 function the same as in FIG. 2, i.e. the control optic 200, the control optic 202, the polarization cube 204, the beam dump 228, the polarization periscope 206, the polarization cube 208, the beam dump 230, the mirror 210, the grating 212, and the focusing mirror 214. For data transmission by the frequency presence modulation unit 112, the relative positions of individual mirrors in the digital mirror array 216 are electronically changed, sending certain wavelengths of light within a spectral band onto the focusing grating 220, while other individual mirrors remain in their non-transmit mode position sending certain wavelengths of light within a spectral band onto the pin diode array 218. That is, the focusing grating 220 receives and focuses a first set of wavelengths of the focused and dispersed spectral content reflected by the digital mirror array 216. The first set of wavelengths are ultimately outputted from the frequency presence modulation unit 112 to the telescope 114 for inclusion in the optical output signal to be transmitted to the data receiver 116. The focusing grating 220 is used to spatially recombine the transmission wavelengths (which were dispersed or separated for data encoding purposes by the grating 212). The dispersion process of the grating 212 leads to spatial and temporal changes in the beam which the focusing grating 212 corrects to maximize the coupling efficiency to the transmission telescope 114.

The pin diode array 218 receives a second set of wavelengths of the focused and dispersed spectral content reflected from the digital mirror array 216 and converts the second set of wavelengths into electrical current which is sent to the controller 110. The second set of wavelengths received by the pin diode array 218 are not transmitted by the telescope 114 and are used for data verification. Light incident onto the focusing grating 220 is focused through a pin hole aperture 224 for beam clean-up and onto the control optic 222. The pin hole aperture 224 receives the first set of wavelengths that are reflected from the focusing grating 220. The pin hole aperture 224 insures proper beam quality and is used to maximize the coupling efficiency to the transmission telescope 114. After the pin hole aperture 224, the beam travels to the control optic 222 which is an optic for collimating the beam after data encoding. Collimation of the beam maximizes the coupling efficiency to the transmission telescope 114. Next, the transmission beam arrives at a polarization periscope 232 (via mirrors 226 and 234) that performs a polarization rotation of the collimated beam received from the control optic 222. The polarization periscope 232 switches the horizontal beam back to a vertical beam. This removes residual polarized horizontal light which proceeds to the beam dump 228 via a mirror 238. Next, a control optic 236 transmits the rotated and collimated beam to the telescope (114). The beam reflected through the control optic 236 yields the frequency presence modulation output beam.

The frequency presence modulation unit 112 of FIGS. 2 and 3 has been described above as receiving vertical polarization components, however a frequency presence modulation unit 112 can also be used that receives horizontal polarization components. When pulse energy in a given band is separated into its vertical and horizontal polarization components, the total number of bands available for optical encoding is doubled. A frequency presence modulation unit 112 for horizontal light utilizes the same components as a frequency presence modulation unit for vertical light (i.e., the frequency presence modulation unit 112 in FIGS. 2 and 3), but the relative positions of mirrors, beam dumps, and polarization periscopes are modified. For example, the beam dump 228 could be swapped with the polarization periscope 206. The polarization periscope 206 would be located at a position closer to the polarization cube 204 than the beam dump 228. The mirror 210 would be moved to the left to reflect the horizontally polarized beam onto the grating 212. The polarization cube 208 would be moved forward (i.e., towards the bottom of FIG. 2) and reoriented 90 degrees clockwise to reflect residual vertical polarized light into the beam dump that would not be positioned in the location previously occupied by the polarization cube 208.

As shown in FIG. 1, the data transmitter 102 also includes a controller 110 for providing a control signal to the frequency presence modulation unit 112 to spectrally segregate the bandwidth of the at least one communication band into the plural channels. Specifically, as seen in FIG. 2, the controller 110 provides a control signal to the digital mirror array 216 to segregate the bandwidth of the at least one communication band into the plural channels. The control signal can control the individual mirrors in the array to control whether each mirror is in the transmit position in which certain wavelengths are directed onto the focusing grating or in the non-transmit position in which certain wavelengths are directed onto the pin diode array 218. In an exemplary embodiment, the controller 110 includes a computer processor. The computer processor may be a single hardware processor, a plurality of hardware processors, or combinations thereof. Hardware processor devices may have one or more processor "cores." The controller 110 may be special purpose or general purpose hardware processor devices. The controller 110 may be connected to a communication infrastructure, such as a bus, message queue, network, multi-core message-passing scheme, etc. The network may be any network suitable for performing the functions as disclosed herein and may include a wireless network (e.g., Wi-Fi), a mobile communication network, a satellite network, fiber optic, coaxial cable, infrared, radio frequency (RF), or any combination thereof. Other suitable network types and configurations will be apparent to persons having skill in the relevant art. The controller 110 may also include a memory (e.g., random access memory, read-only memory, etc.). The memory may be read from and/or written to in a well-known manner. In an embodiment, the memory may be non-transitory computer readable recording media. The controller 110 can perform the data verification, or this can be performed in a data verification device 124. The controller 110 operates based on a signal received from a clock and timing device 122. The clock and timing device 122 receives a signal from the optical emission device 104.

Figure 4:
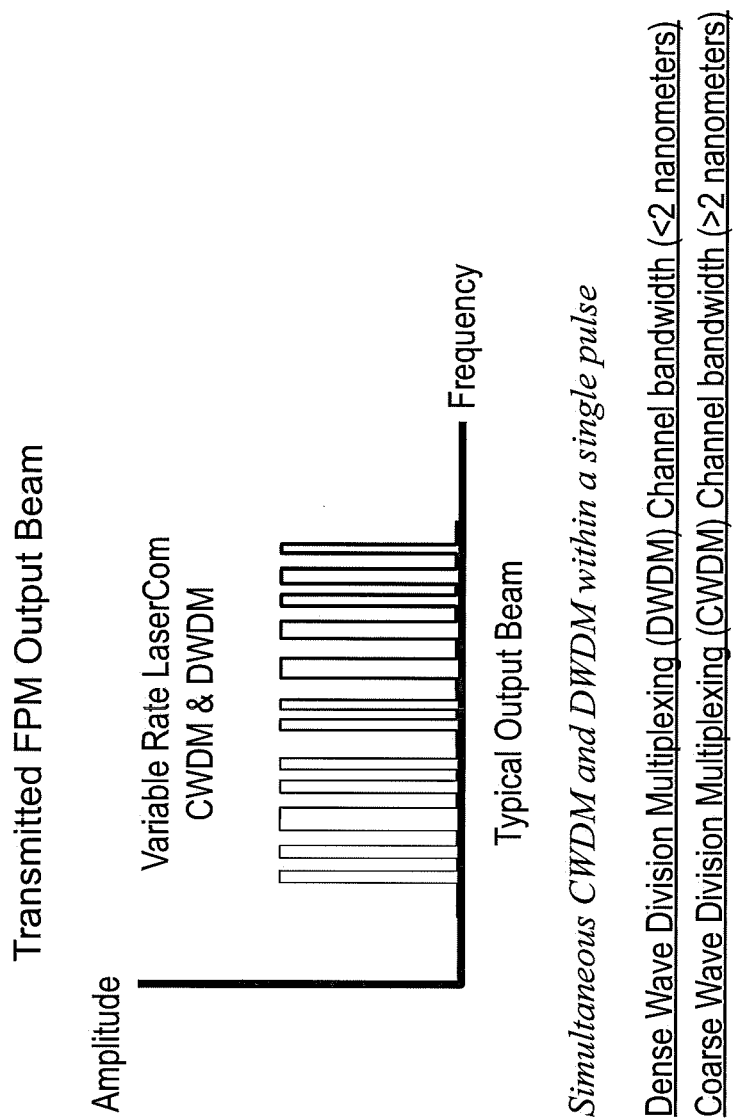
FIG. 4 illustrates a transmitted frequency presence modulation output beam in accordance with an exemplary embodiment.

As shown in FIG. 1, the data transmitter 102 also includes a telescope 114 configured to transmit the optical output signal to a data receiver 116. An example of the optical output signal is shown in FIG. 4. FIG. 4 shows dense wave division multiplexing and coarse wave division multiplexing within one output beam, which provides a variable data rate. As seen in FIG. 4, the spectral content of certain frequencies is present, and the spectral content of certain frequencies is not present. In an exemplary embodiment, the transmitted output beam can be encrypted. Examples of cryptographic modules/encryption schemes that could be used include: NIST FIPS 140-2, AES 256, Ciena 6500 Flex3 WaveLogic 3e OCLD, Check Point CryptoCore, FIPS Crypto Module by Ionic Security Inc., Tanium Cryptographic Module, etc.

As shown in FIG. 1, the data transmitter 102 also includes a voltage management device 120 and a power management device 118 that are connected to the frequency presence modulation unit 112.

Figure 8:
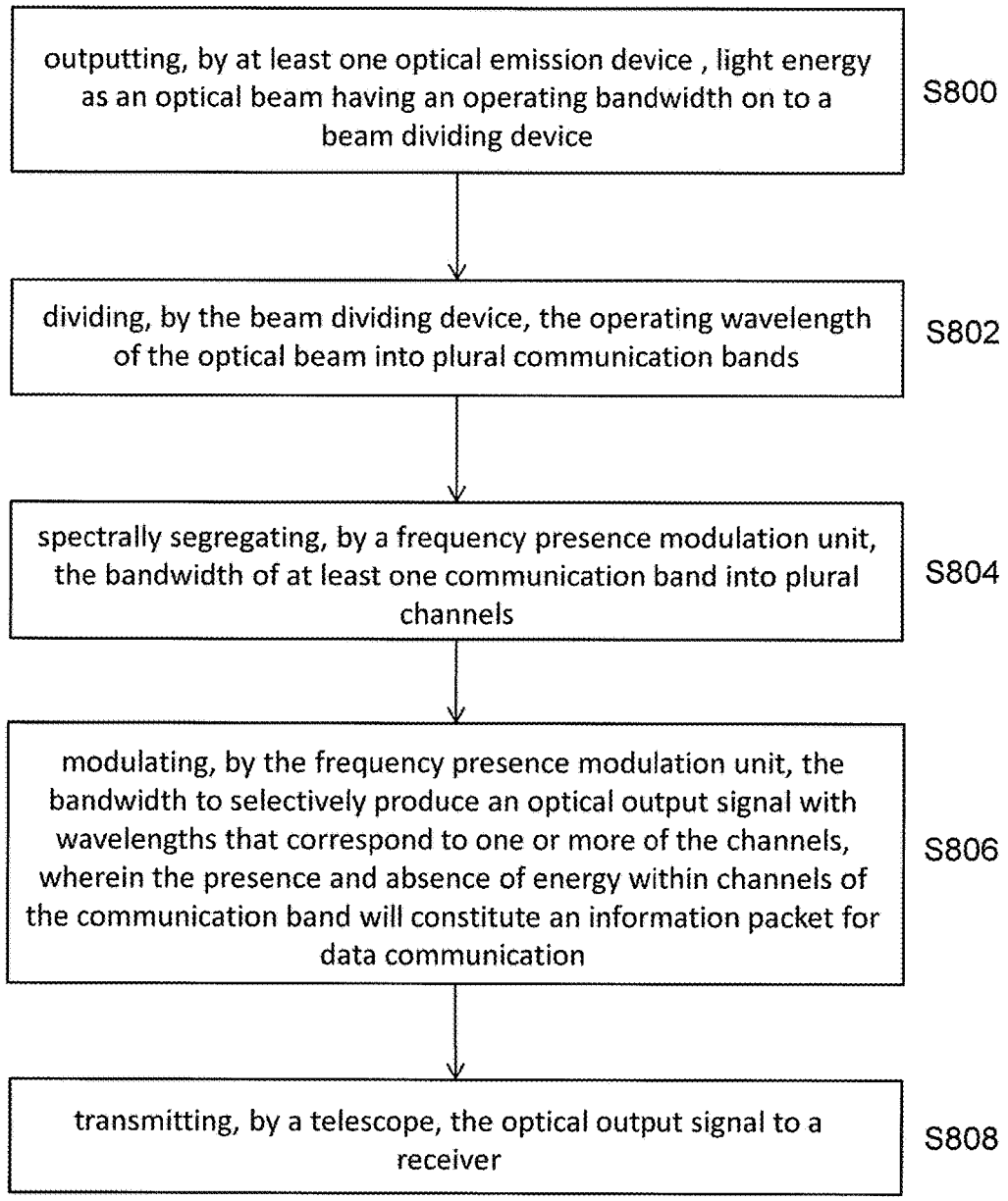
FIG. 8 is a flow chart illustrating a method according to an exemplary embodiment.

FIG. 8 is a flow chart illustrating an exemplary method for optical communication performed by the data transmitter 102. The method includes, in step S800, outputting, by at least one optical emission device 104, light energy as an optical beam 106 having an operating bandwidth on to the beam dividing device 108. Step S802 includes dividing, by the beam dividing device 108, the operating wavelength of the optical beam into plural communication bands. Step S804 includes spectrally segregating, by the frequency presence modulation unit 112, the bandwidth of at least one communication band into plural channels. Step S806 includes modulating, by the frequency presence modulation unit 112, the bandwidth to selectively produce an optical output signal with wavelengths that correspond to one or more of the channels. The presence and absence of energy within channels of the communication band will constitute an information packet for data communication. Step S808 includes transmitting, by the telescope 114, the optical output signal to the receiver 116.

Figure 9A:
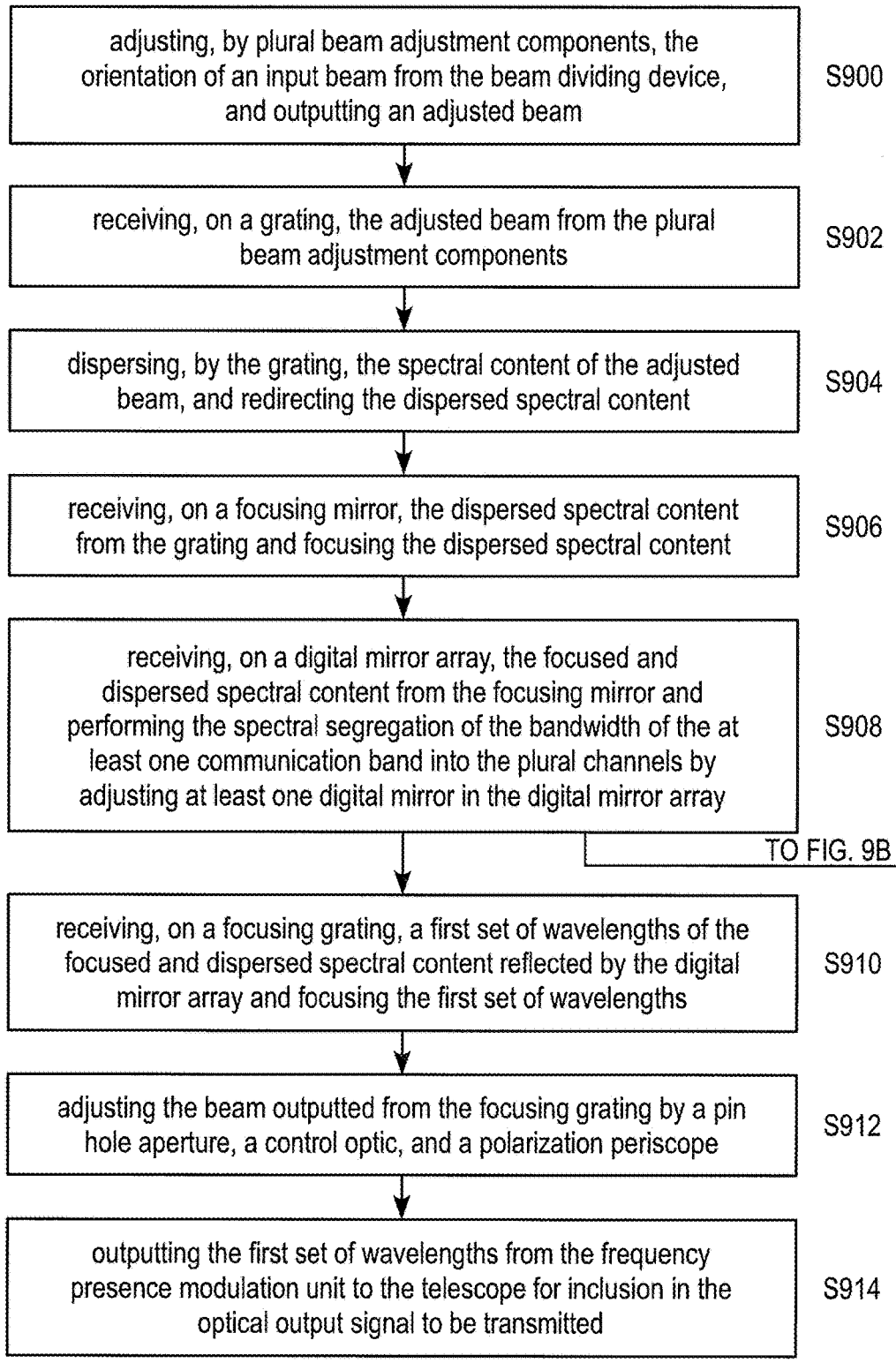
FIGS. 9A and 9B are flow charts illustrating a method according to an exemplary embodiment.
Figure 9B:
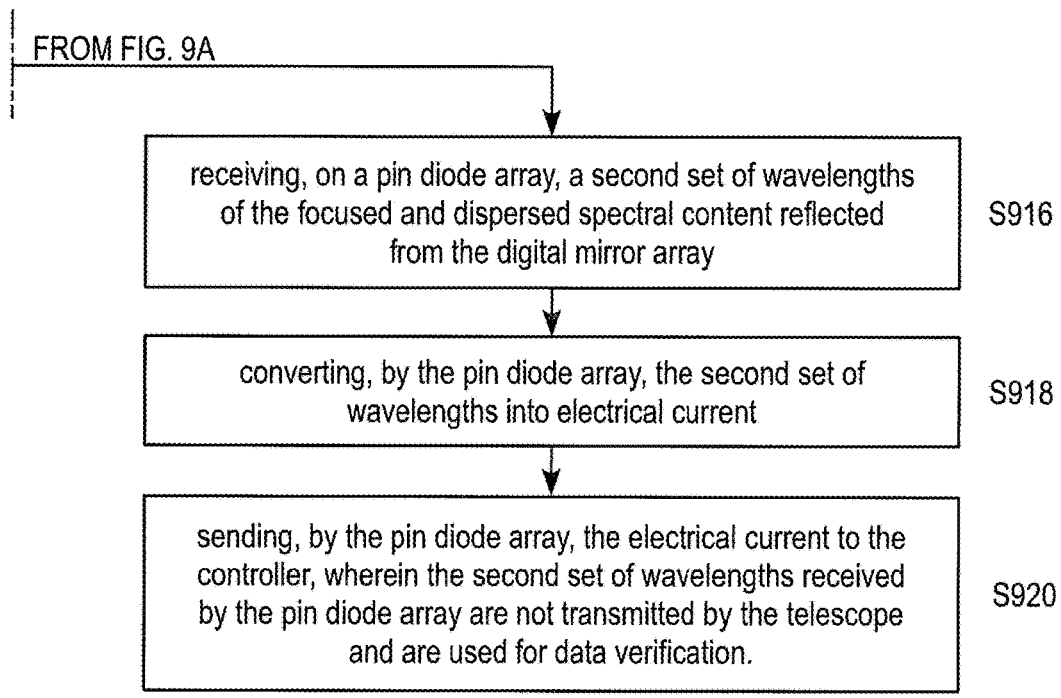

FIGS. 9A and 9B are flow charts that show further details of Steps S804 and S806 of the method of FIG. 8, which are performed by the frequency presence modulation unit 112. The method includes, in step S900, adjusting, by plural beam adjustment components, the orientation of an input beam from the beam dividing device 108, and outputting an adjusted beam on to a grating 212. The plural beam adjustment components can include at least one control optic 200, 202, at least one polarization cube 204, 208, a polarization periscope 206, and a mirror 210. The control optics 200, 202 have a corresponding beam dump device 228, 230 that absorb unwanted light.

Step S902 includes receiving, on the grating 212, the adjusted beam from the plural beam adjustment components described above. Step S904 includes dispersing, by the grating 212, the spectral content of the adjusted beam, and redirecting the dispersed spectral content. Step S906 includes receiving, on the focusing mirror 214, the dispersed spectral content from the grating 212 and focusing the dispersed spectral content. Step S908 includes receiving, on the digital mirror array 216, the focused and dispersed spectral content from the focusing mirror 214 and performing the spectral segregation of the bandwidth of the at least one communication band into the plural channels by adjusting at least one digital mirror in the digital mirror array 216.

Steps S910, S912, and S914 relate to the steps that are performed to create the beam outputted from the frequency presence modulation unit 112. Step S910 includes receiving, on the focusing grating 220, a first set of wavelengths of the focused and dispersed spectral content reflected by the digital mirror array 216 and focusing the first set of wavelengths. Step S912 includes adjusting the beam outputted from the focusing grating by the pin hole aperture 224, the control optic 222, and the polarization periscope 232. In an exemplary embodiment, the pin hole aperture 224 receives the first set of wavelengths that are reflected from the focusing grating 220. The control optic 222 collimates a beam outputted from the pin hole aperture 224, and a polarization periscope 232 performs a polarization rotation of the collimated beam received from the control optic 222. A second control optic 236 transmits the rotated and collimated beam to the telescope 114. Step S914 includes outputting the first set of wavelengths from the frequency presence modulation unit 112 to the telescope 114 for inclusion in the optical output signal to be transmitted.

Steps S916, S918, and S920 relate to the steps that are performed to verify the data that is transmitted from the frequency presence modulation unit 112. Step S916 includes receiving, on the pin diode array 218, a second set of wavelengths of the focused and dispersed spectral content reflected from the digital mirror array 216. Step S918 includes converting, by the pin diode array 218, the second set of wavelengths into electrical current. Step S920 includes sending, by the pin diode array 218, the electrical current to the controller 110. The second set of wavelengths received by the pin diode array 218 are not transmitted by the telescope 114, and are instead used for data verification of the optical output signal of the frequency presence modulation unit 112.

Figure 5:
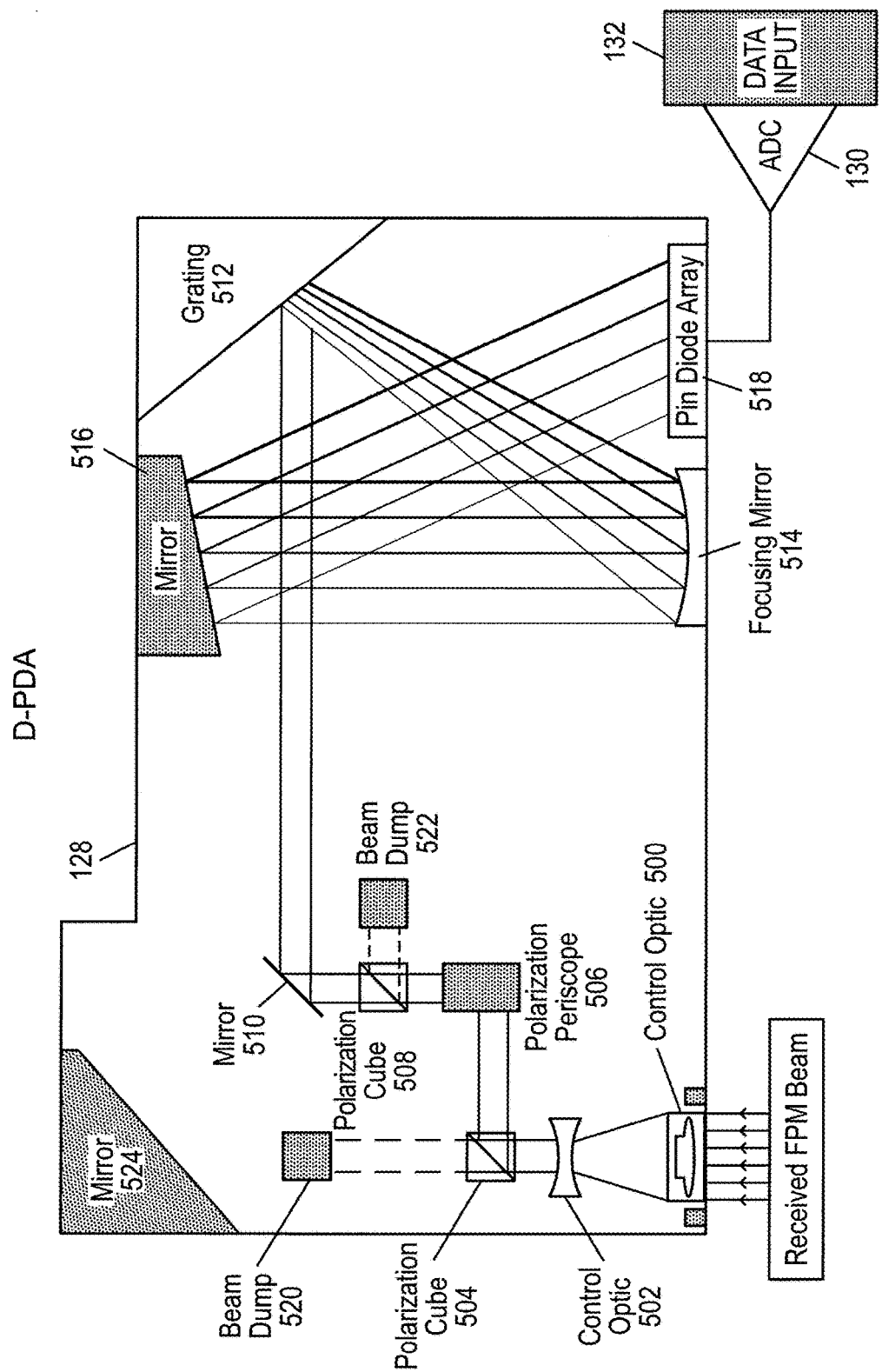
FIG. 5 illustrates a hardware architecture of a receiver in accordance with an exemplary embodiment.

Further details of the components of the data receiver 116 are shown in FIGS. 1 and 5, and are discussed next. As seen in FIG. 1, some of the components present in the data transmitter 102 are also present in the data receiver 116. The data receiver 116 includes a telescope 126 to receive the optical output signal (i.e., the frequency presence modulation output beam) transmitted by the telescope 114. A digital photodiode array (D-PDA) 128 receives a beam output from the telescope 126. FIG. 5 shows the components of the digital photodiode array 128, some of which are the same or similar to the components of the frequency presence modulation unit 112 of the data transmitter 102. The control optic 500, control optic 502, polarization cube 504, beam dump 520, polarization periscope 506, polarization cube 508, beam dump 522, mirror 510, grating 512, focusing mirror 514, pin diode array 518, and mirror 524 are similar or the same as the control optic 200, control optic 202, polarization cube 204, beam dump 220, polarization periscope 206, polarization cube 208, beam dump 222, mirror 210, grating 212, focusing mirror 214, pin diode array 218, and mirror 238, respectively. In FIG. 5, the mirror 516 can be a standard fixed mirror, as all of the light of the spectral band is reflected onto the pin diode array 518 to determine which wavelengths are present. An analog-to-digital converter 130 receives an electrical signal that is outputted from the digital photodiode array 128. After the digital photodiode array 128, the signal enters a data input device 132 that includes a field programmable gate array. The output of the data input device 132 can be in the Ethernet format, for example. A host processor 134 receives the Ethernet signal, and decodes the received data corresponding to the frequency presence modulation output beam received by the telescope 126. The host processor 134 is connected to a clock and timing device 138, a voltage management device 140, and a power management device 142. The host processor 134 is connected to a data output device 136 that can be any type of data output section, i.e., firewire, Ethernet, HDMI, toslink, VGA, Wi-Fi, etc.

An exemplary method performed by the data receiver 116 includes receiving, by the telescope 126, the optical output signal transmitted by the telescope 114. The method also includes receiving, by the digital photodiode array 128, a beam output from the telescope 126. Next, the method includes receiving, by the analog-to-digital converter 130, an output electrical signal from the digital photodiode array 128.

FIG. 7 shows an array 700 of n frequency presence modulation units 112 and how they are connected to the telescope 114 and the optical emission device 104. The n frequency presence modulation units 112 each channelize bands having different frequencies. The optical emission device 104 outputs an optical beam that is reflected by a broadband reflector 702, and then the beam is redirected by a spectral bandpass filter 704 that is associated with each of the frequency presence modulation units 112. The beam is routed via a spectral bandpass filter 704 to the associated frequency presence modulation unit 112. The components of each frequency presence modulation unit 112 are the same or similar to those shown in FIGS. 2 and 3. Each frequency presence modulation unit is designed for the particular frequency band it will channelize. The beam outputted by each frequency presence modulation unit 112 is directed by one or more mirrors 706 to the telescope 114 for transmission. The mirrors 706 can be, for example, highly reflective mirrors.

Figure 10:
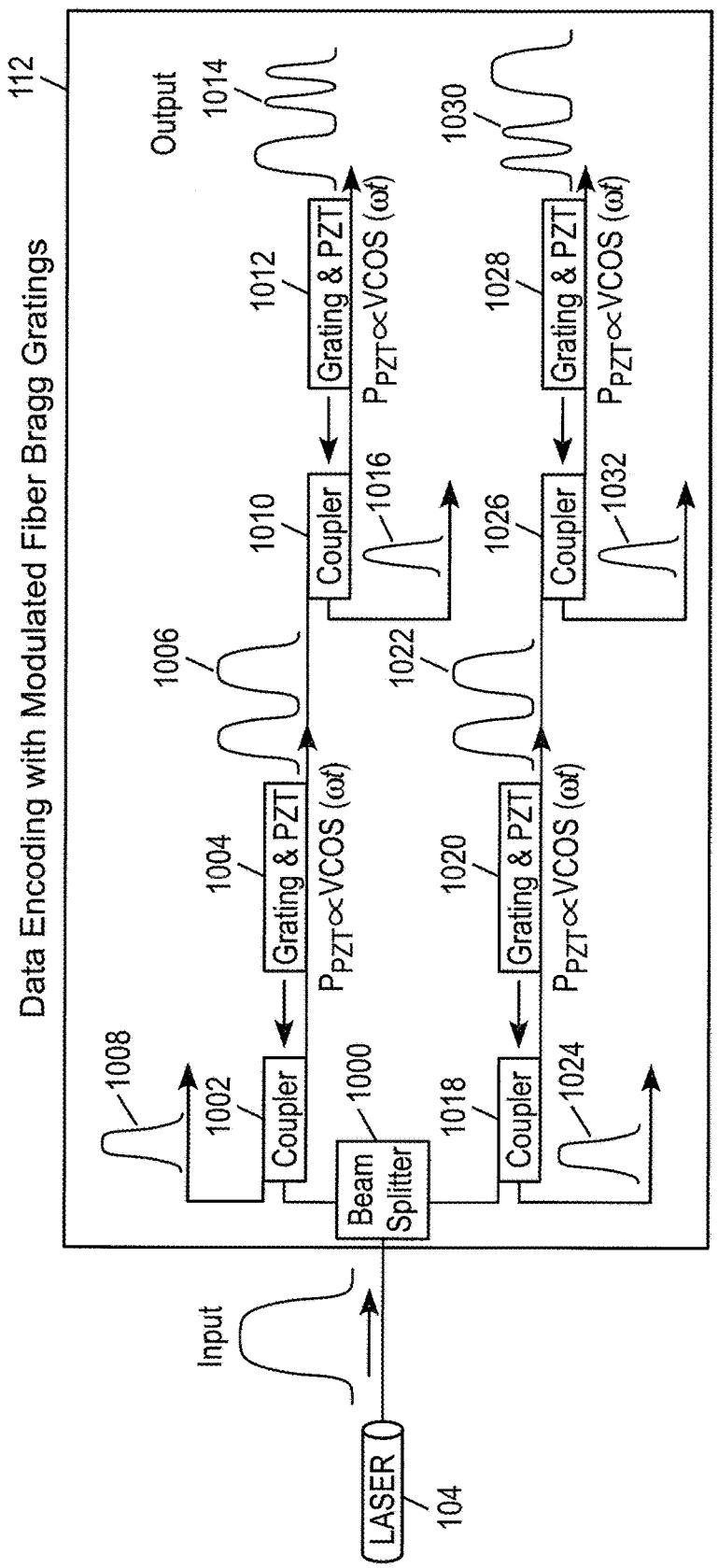
FIG. 10 illustrates data encoding performed by modulating Fiber Bragg Gratings in accordance with an exemplary embodiment.
Figure 11:
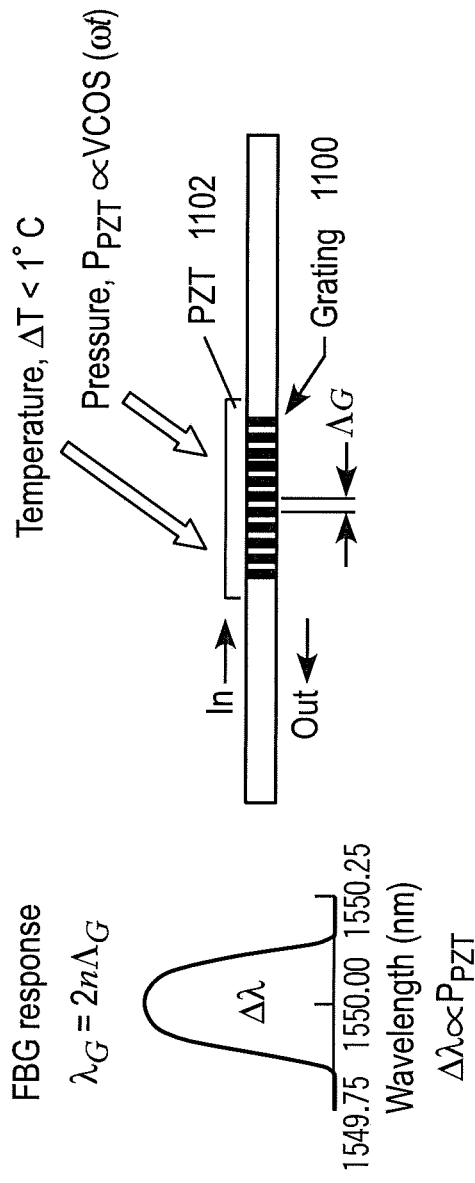
FIG. 11 illustrates data encoding performed by modulating Fiber Bragg Gratings in accordance with an exemplary embodiment.
Figure 12:
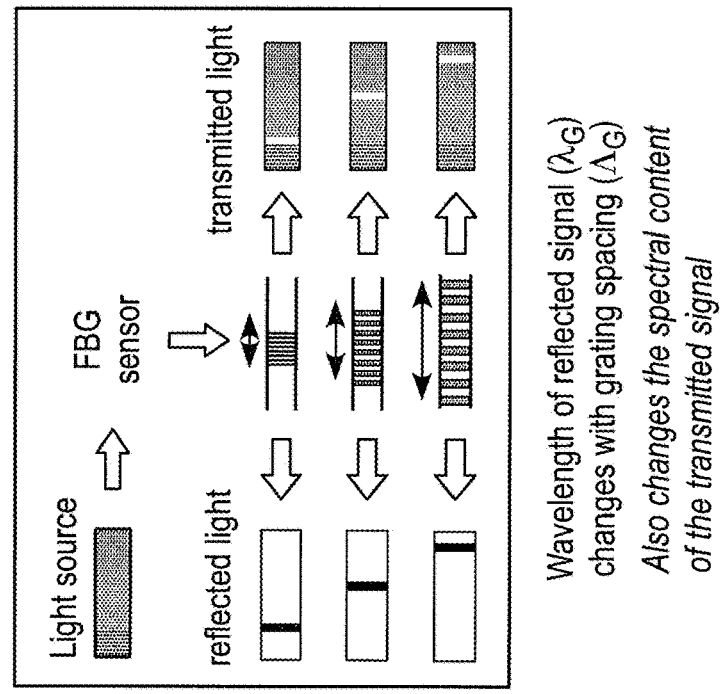
FIG. 12 illustrates data encoding performed by modulating Fiber Bragg Gratings in accordance with an exemplary embodiment.
Figure 12:
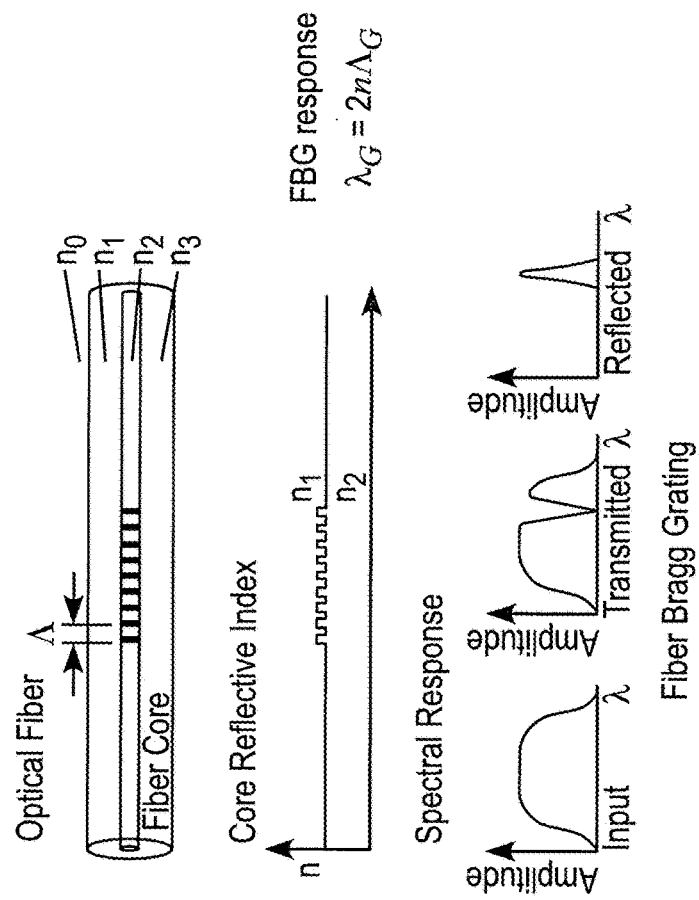

FIGS. 10-12 illustrate an exemplary embodiment of a system for narrow band (e.g., 5 nm) M-ary frequency presence modulated communications in which the frequency presence modulation unit 112 performs data encoding by modulating Fiber Bragg Gratings. This approach can be used for low (10's Kbps) to medium (10's Mbps) data rates. The hardware of the data transmitter used for this type of communication is the same as the data transmitter 102, except that there is no beam dividing device 108, and the frequency presence modulation unit 112 has the hardware configuration shown in FIG. 10. In FIG. 10, a beam splitter 1000 creates two or more separate communication paths. The number of communication paths is a function of available power from the optical emission device 104. For example, a laser source with n-times the power required to close the communications link can be split into n separate communication paths. Multiple communication paths enable the laser communication terminal to be used simultaneously by multiple users. In FIG. 10, there are two communication paths. An alternate configuration is to use multiple laser sources operating at different wavelengths, as opposed to using a laser with n-times the required link closure power. Output couplers 1002, 1010, 1018, and 1026 are commercially available fiber optic components for combining or separating optical frequencies within optical fibers. Data encoding is performed by one or more gratings and a corresponding piezoelectric transducer (PZT) 1004, 1012, 0120, and 0128. FIG. 11 shows a grating 1100 and a corresponding PZT 1102 in detail. Data encoding is performed by the PZT 1102 which modulates the grating 1100 spacing, which modulates the spectral content of the reflected and transmitted signal. Signals 1006 and 1022 are examples of transmitted signals, and signals 1008, 1018, 1016, and 1032 are examples of reflected signals used for data verification. Signal 1014 is outputted from the upper communication path, and signal 1030 is outputted from the lower communication path, and these signals will be output to the telescope 114. In an exemplary embodiment, the modulating of the bandwidth is performed by the piezoelectric transducer 1102 that modulates spacing of the grating 1100 based on a control signal provided to the piezoelectric transducer 1102 by the controller 110.

As shown in FIG. 11, the grating 1100 spacing changes with applied temperature and pressure, and the grating spacing modulates the spectral content of the reflected and transmitted signal. Pressure of the PZT, $P_{PZT}$, is proportional to VCOS($\omega$t), where V is voltage. The PZT 1102 is controlled by a signal sent by the controller 110. For example, the pressure of the PZT, $P_{PZT}$, is controlled by the controller 110. Voltages as well as frequencies are changed in order to actively change the central frequency and frequency content of the light reflected and transmitted through the fibers. The change in temperature, $\Delta T$, applied to the PZT 1102 is less than 1° C. As seen in FIG. 11, the change in wavelength, $\Delta \lambda$, is proportional to the pressure of the PZT 1102, $P_{PZT}$. As seen in FIG. 12, the wavelength of the reflected signal $\lambda_G$ is equal to 2 n$\wedge_G$, where $\wedge_G$ is the grating spacing and n is an optical fiber core reflective index.

In an exemplary embodiment, an optical communication system 100 for narrow band M-ary frequency presence modulated communications using Fiber Bragg Gratings includes the data transmitter 102 that includes at least one optical emission device 104, the frequency presence modulation unit 112 of FIG. 10, the controller 110, and the telescope 114. The at least one optical emission device 104 is configured to output light energy as an optical beam 106 having an operating bandwidth with at least one communication band. The frequency presence modulation unit 112 is configured to spectrally segregate the bandwidth of the at least one communication band into plural channels, and modulate the bandwidth to selectively produce an optical output signal with wavelengths that correspond to one or more of the channels. The presence and absence of energy within channels of the communication band will constitute an information packet for data communication. The controller 110 provides a control signal to the frequency presence modulation unit 112 to spectrally segregate the bandwidth of the at least one communication band into the plural channels. The telescope 114 transmits the optical output signal to the receiver 116. The receiver 116 used for the narrow bandwidth approach would be very similar to the receiver used for ultra-wide band communications, except that the spectral range (i.e., sensing range) of the receiver is smaller and the spectral resolution is finer than the receiver used for ultra-wide band communications.

In an exemplary embodiment, the frequency presence modulation unit 112 includes at least one grating 1100 and at least one corresponding piezoelectric transducer 1102 configured to modulate spacing of the at least one grating 1100 based on the control signal provided by the controller 110.

In an exemplary embodiment, the frequency presence modulation unit 112 includes at least two communication paths, and each communication path includes at least one grating 1100, at least one corresponding piezoelectric transducer 1102, and at least one coupler 1002.

Where the present disclosure is implemented using software, the software may be stored in a computer program product or non-transitory computer readable medium and loaded into the controller 110 using a removable storage drive or a communications interface.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An optical communication system, comprising:
    a data transmitter including:
        at least one optical emission device configured to output light energy as an optical beam having an operating bandwidth;
        a beam dividing device arranged to receive and divide the operating bandwidth of the optical beam into bandwidth portions of plural communication bands;
        a frequency presence modulation unit configured to:
            spectrally segregate a bandwidth portion of at least one communication band into plural channels, and
            modulate the bandwidth portion to selectively produce an optical output signal with wavelengths that correspond to one or more of the channels, wherein a presence and absence of energy within channels of the communication band will constitute an information packet for data communication;
        a controller for providing a control signal to the frequency presence modulation unit to spectrally segregate the bandwidth portion of the at least one communication band into the plural channels; and
        a telescope configured to transmit the optical output signal.

2. The optical communication system of claim 1, wherein the at least one optical emission device is an ultra-wide bandwidth laser or an ultra-wide bandwidth light emitting diode.

3. The optical communication system of claim 1, wherein the beam dividing device is at least one spectral bandpass filter or at least one fiber optic grating.

4. The optical communication system of claim 1, wherein each of the plural communication bands has the same bandwidth.

5. The optical communication system of claim 1, wherein at least one channel in a band has a different bandwidth than another channel in the same band.

6. The optical communication system of claim 1, wherein the frequency presence modulation unit comprises:
    plural beam adjustment components that adjust the orientation of an input beam from the beam dividing device, and output an adjusted beam;
    a grating that receives the adjusted beam from the plural beam adjustment components, disperses the spectral content of the adjusted beam, and redirects the dispersed spectral content;
    a focusing mirror that receives the dispersed spectral content from the grating and focuses the dispersed spectral content;
    a digital mirror array that receives the focused and dispersed spectral content from the focusing mirror and performs the spectral segregation of the bandwidth of the at least one communication band into the plural channels by adjusting at least one digital mirror in the digital mirror array;
    a focusing grating that receives and focuses a first set of wavelengths of the focused and dispersed spectral content reflected by the digital mirror array, wherein the first set of wavelengths are outputted from the frequency presence modulation unit to the telescope for inclusion in the optical output signal to be transmitted; and
    a pin diode array that receives a second set of wavelengths of the focused and dispersed spectral content reflected from the digital mirror array and converts the second set of wavelengths into electrical current which is sent to the controller, wherein the second set of wavelengths received by the pin diode array are not transmitted by the telescope and are used for data verification.

7. The optical communication system of claim 6, comprising:
    a pin hole aperture that receives the first set of wavelengths that are reflected from the focusing grating;
    a control optic that collimates a beam outputted from the pin hole aperture;
    a polarization periscope that performs a polarization rotation of the collimated beam received from the control optic; and
    a second control optic that transmits the rotated and collimated beam to the telescope.

8. The optical communication system of claim 6, wherein the plural beam adjustment components comprise:
    at least one control optic, at least one polarization cube, and a polarization periscope.

9. The optical communication system of claim 8, wherein the at least one control optic comprises:
    a corresponding beam dump device that absorbs unwanted light.

10. The optical communication system of claim 1, in combination with a data receiver that comprises:
    a second telescope to receive the optical output signal transmitted by the telescope;
    a digital photodiode array that receives a beam output from the second telescope; and
    an analog-to-digital converter that receives an output electrical signal from the digital photodiode array.

11. A data receiver, comprising:
    a telescope to receive the optical output signal transmitted by the transmitting telescope of claim 1;
    a digital photodiode array that receives a beam output from the telescope, wherein the digital photodiode array includes:
        a grating that disperses spectral content of the beam a mirror that and redirects the dispersed spectra content;
        a focusing mirror that receives the dispersed spectral content from the grating and focuses the dispersed spectral content; and
        a second mirror that receives the focused spectral content and directs the focused spectral content onto a pin diode array.

12. A method for optical communication, the method comprising:
    outputting, by at least one optical emission device, light energy as an optical beam having an operating bandwidth on to a beam dividing device;

dividing, by the beam dividing device, the operating bandwidth of the optical beam into bandwidth portions of plural communication bands;
spectrally segregating, by a frequency presence modulation unit, a bandwidth portion of at least one communication band into plural channels;
modulating, by the frequency presence modulation unit, the bandwidth portion to selectively produce an optical output signal with wavelengths that correspond to one or more of the channels, wherein a presence and absence of energy within channels of the communication band will constitute an information packet for data communication; and
transmitting, by a telescope, the optical output signal.

13. The method of claim 12, wherein the at least one optical emission device is an ultra-wide bandwidth laser or an ultra-wide bandwidth light emitting diode.

14. The method of claim 12, wherein the beam dividing device is at least one spectral bandpass filter or at least one fiber optic grating.

15. The method of claim 12, wherein each of the plural communication bands has the same bandwidth.

16. The method of claim 12, wherein at least one channel in a band has a different bandwidth than another channel in the same band.

17. The method of claim 12, comprising:
adjusting, by plural beam adjustment components, the orientation of an input beam from the beam dividing device, and outputting an adjusted beam;
receiving, on a grating, the adjusted beam from the plural beam adjustment components;
dispersing, by the grating, the spectral content of the adjusted beam, and redirecting the dispersed spectral content;
receiving, on a focusing mirror, the dispersed spectral content from the grating and focusing the dispersed spectral content;
receiving, on a digital mirror array, the focused and dispersed spectral content from the focusing mirror and performing the spectral segregation of the bandwidth of the at least one communication band into the plural channels by adjusting at least one digital mirror in the digital mirror array;
receiving, on a focusing grating, a first set of wavelengths of the focused and dispersed spectral content reflected by the digital mirror array and focusing the first set of wavelengths;
outputting the first set of wavelengths from the frequency presence modulation unit to the telescope for inclusion in the optical output signal to be transmitted;
receiving, on a pin diode array, a second set of wavelengths of the focused and dispersed spectral content reflected from the digital mirror array;
converting, by the pin diode array, the second set of wavelengths into electrical current; and
sending, by the pin diode array, the electrical current to the controller, wherein the second set of wavelengths received by the pin diode array are not transmitted by the telescope and are used for data verification.

18. The method of claim 17, comprising:
receiving, by a pin hole aperture, the first set of wavelengths that are reflected from the focusing grating;
collimating, by a control optic, a beam outputted from the pin hole aperture;
performing, by a polarization periscope, a polarization rotation of the collimated beam received from the control optic; and
transmitting, by a second control optic, the rotated and collimated beam to the telescope.

19. The method of claim 17, wherein the plural beam adjustment components comprise:
at least one control optic, at least one polarization cube, and a polarization periscope.

20. The method of claim 19, wherein the at least one control optic comprises:
a corresponding beam dump device that absorbs unwanted light.

21. The method of claim 12, comprising:
receiving, by a second telescope, the optical output signal transmitted by the telescope;
receiving, by a digital photodiode array, a beam output from the second telescope; and
receiving, by an analog-to-digital converter, an output electrical signal from the digital photodiode array.

22. An optical communication system, comprising:
a data transmitter including:
at least one optical emission device configured to output light energy as an optical beam having an operating bandwidth with at least one communication band;
a frequency presence modulation unit configured to:
spectrally segregate the bandwidth of the at least one communication band into plural channels, and
modulate the bandwidth to selectively produce an optical output signal with wavelengths that correspond to one or more of the channels, wherein a presence and absence of energy within channels of the communication band will constitute an information packet for data communication;
a controller for providing a control signal to the frequency presence modulation unit to spectrally segregate the bandwidth of the at least one communication band into the plural channels; and
a telescope configured to transmit the optical output signal.

23. The optical communication system of claim 22, wherein the frequency presence modulation unit comprises:
at least one grating and at least one corresponding piezoelectric transducer configured to modulate spacing of the at least one grating based on the control signal provided by the controller.

24. The optical communication system of claim 22, wherein the frequency presence modulation unit comprises:
at least two communication paths, wherein each communication path includes at least one grating, at least one corresponding piezoelectric transducer, and at least one coupler.

25. A method for optical communication, the method comprising:
outputting, by at least one optical emission device, light energy as an optical beam having an operating bandwidth with at least one communication band;
spectrally segregating, by a frequency presence modulation unit, a bandwidth of at least one communication band into plural channels;
modulating, by the frequency presence modulation unit, the bandwidth to selectively produce an optical output signal with wavelengths that correspond to one or more of the channels, wherein a presence and absence of energy within channels of the communication band will constitute an information packet for data communication; and
transmitting, by a telescope, the optical output signal.

26. The method of claim 25, wherein the modulating is performed by a piezoelectric transducer that modulates spacing of a grating based on a control signal provided to the piezoelectric transducer by a controller.

* * * * *